United States Patent [19]
Loshbough

[11] Patent Number: 4,917,199
[45] Date of Patent: Apr. 17, 1990

[54] AUTOMATIC VERIFICATION OF VARIABLE CAPACITANCE WEIGHING APPARATUS

[75] Inventor: Richard C. Loshbough, Westerville, Ohio

[73] Assignee: Toledo Scale Corp., Ohio

[21] Appl. No.: 335,697

[22] Filed: Apr. 10, 1989

[51] Int. Cl.$^4$ .................... G01G 3/14; G01G 19/52
[52] U.S. Cl. .................................. 177/210 C; 177/50
[58] Field of Search ...................... 177/50, 164, 210 C

[56] References Cited
U.S. PATENT DOCUMENTS

| | | | |
|---|---|---|---|
| 4,310,893 | 1/1982 | Loshbough | 177/50 X |
| 4,799,558 | 1/1989 | Griffen | 177/211 |

Primary Examiner—George H. Miller, Jr.
Attorney, Agent, or Firm—Roy F. Hollander

[57] ABSTRACT

Weighing apparatus including variable capacitance load sensing means, a capacitance detection circuit, an analog to digital convertor and microcomputer control means is automatically verified for accurate operation. The capacitance detection circuit is provided with a computer controlled verification switch by which the value of a parameter, such as resistance in an attenuation circuit, can be changed. Automatic verification of correct operation is obtained by periodically, with no weight on the scale, obtaining a first weight reading, operating the verification switch to change the parameter and obtaining a second weight reading. The difference between the two readings is a verification value and is compared to a stored verification value obtained in the same manner during calibration and stored for later use. If the difference between the obtained and stored verification values exceeds an allowable limit, the scale may be disabled from further weighing.

15 Claims, 2 Drawing Sheets

AUTOMATIC VERIFICATION OF VARIABLE CAPACITANCE WEIGHING APPARATUS

BACKGROUND OF THE INVENTION

This invention relates to weighing apparatus employing a variable capacitance load cell and more particularly to an arrangement for automatically verifying the correct operation of such weighing apparatus.

Weighing scales, particularly those intended for commercial use, must meet a number of requirements for performance while not being excessively costly. The scales must be sufficiently accurate to satisfaction their application requirements and, in many cases, to satisfy public weights and measures authorities. The required accuracy must also be maintained as long as the scale is in use. Many weighing scales in use in recent years employ strain gauge load cells as the weight sensing element and process a weight signal through analog and digital circuits before the weight indication in digital form is displayed or otherwise utilized. Relatively slight changes in the parameters in the signal path caused by, for example, aging or failure of a component, can produce unacceptable error in the weight indication.

It is known to provide automatic verification procedures in electronic scales to periodically verify the accuracy of the scale. In U.S. Pat. No. 4,310,893, for example, there is disclosed an automatic verification procedure in a weighing scale employing a strain gauge load cell. In that scale, an analog signal of sufficient accuracy is introduced into the electrical system as a weight simulating signal after each weighing operation has been completed, and no load is on the scale. This verification signal is then processed by the entire analog and digital circuits of the scale and compared with a previously stored reference digital value corresponding to correct operation of the scale in response to the verification signal. If the compared values correspond within predetermined tolerance limits, the scale is in condition for further weighing operations. If the difference is not within tolerance limits, the scale may be disenabled from further weighing.

Recently, there have appeared scales intended for applications requiring high accuracy and employing variable capacitance load cells as the load sensing element. These scales also employ analog and digital circuits for obtaining and processing a weight signal, and would benefit from an automatic verification procedure.

SUMMARY OF THE INVENTION

The present invention provides automatic verification of weighing apparatus employing a variable capacitance load cell as the load sensing member.

Weighing apparatus embodying the present invention includes load responsive means incorporating a capacitance that is variable in response to applied loads and a circuit for detecting capacitance changes and providing a weight signal in response thereto. The accuracy of the weighing apparatus is verified by changing a parameter in the capacitance detection circuit and using the changed parameter to verify correct operation of the scale. More particularly, the verification procedure involves determining the change in the weight signal obtained with the change in this parameter. This change or difference is then compared to a stored difference obtained in the same way during calibration to verify the operation of the weighing apparatus.

Preferably, the variable capacitance includes a pair of capacitors connected in series, at least one of the capacitors being variable in response to applied loads. Means are provided for causing the capacitors to store a predetermined charge and a feedback network is coupled to the capacitors for providing a feedback signal representing the difference in charge on the capacitors from the predetermined value. The feedback signal is indicative of the capacitance of the variable capacitor and of the weight on the scale. For automatic verification, the value of a parameter in the feedback network is changed to modify the feedback signal. The difference between an unmodified feedback signal and the modified feedback signal is determined and compared to a previously stored difference to check the operation of the weighing apparatus.

DESCRIPTION OF A PREFERRED EMBODIMENT

Figure 1:
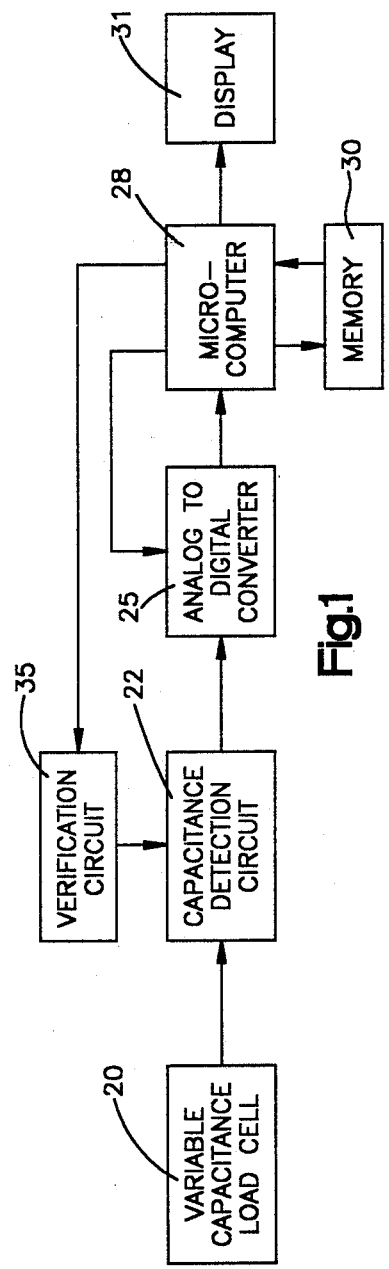
FIG. 1 is a block diagram of weighing apparatus embodying the present invention.

As shown in FIG. 1, weighing apparatus embodying the present invention includes a variable capacitance load cell 20 and a capacitance detection circuit 22. Load cell 20 may include, for example, a fixed member and/or one or more movable members which deflect toward or away from the fixed member and/or from each other in response to an applied load. Opposing plates attached to the members form one or more capacitors having values which vary with the applied load. Preferably, the plates are arranged to form a pair of differential capacitors, the value of one increasing and the other decreasing under applied load. Examples of variable capacitance load cells are shown in U.S. Pat. No. 4,799,558.

The capacitors of load cell 20 are connected electrically in series in capacitance detection circuit 22. Circuit 22 produces an analog signal indicative of the variable capacitance of load cell 20 and, therefore, of the weight on load cell 20. The analog weight signal from circuit 22 is provided to A/D converter 25, where it is converted to a digital value and transmitted to microcomputer 28 which has associated memory 30. The digital signals are processed in any desired ways in microcomputer 28, and a digital weight indication, along with other information desired, is provided to display 31.

The weighing system of FIG. 1 operates under control of microcomputer 28 with associated memory 30. The microcomputer is programmed to monitor and control the weighing operation, perform various operations on the weight signals and provide them to display 31, all of which is well known to those skilled in the art. Preferably, microcomputer 28 includes a 80C51FA microprocessor manufactured by Intel Corporation.

In accordance with the present invention, a verification circuit 35 is connected to capacitance detection circuit 22 to enable automatic verification of the correct operation of the weighing system. The verification procedure is performed under control of microcomputer 28, preferably at timed intervals. When such an interval has been reached, microcomputer 28 will, if the scale is stable and at rest with no load thereon, obtain a verification value through operation of the weighing system. It will then compare the verification value so obtained with a verification value obtained in the same manner during scale calibration and stored in memory 30 for use in automatic verification during operation of the weighing system.

According to the present invention, the verification value is the difference between a weight reading taken with no load on the scale and a like reading taken after verification circuit 35 has been instructed by microcomputer 28 to change the value of a parameter in capacitance detection circuit 22. The difference between these weight readings constitutes the verification value. This value is compared to the stored verification value obtained in the same manner during calibration of the weighing system. If the result of the comparison is within allowable tolerance limits, the weighing system continues in operation as before. If the result of the comparison is outside tolerance limits, steps may be taken to disenable the scale from further weighing.

As will be evident from the discussion below, the verification procedure chosen according to the present invention checks a maximum number of scale components to provide reliable verification of the operation of the scale.

Figure 2:
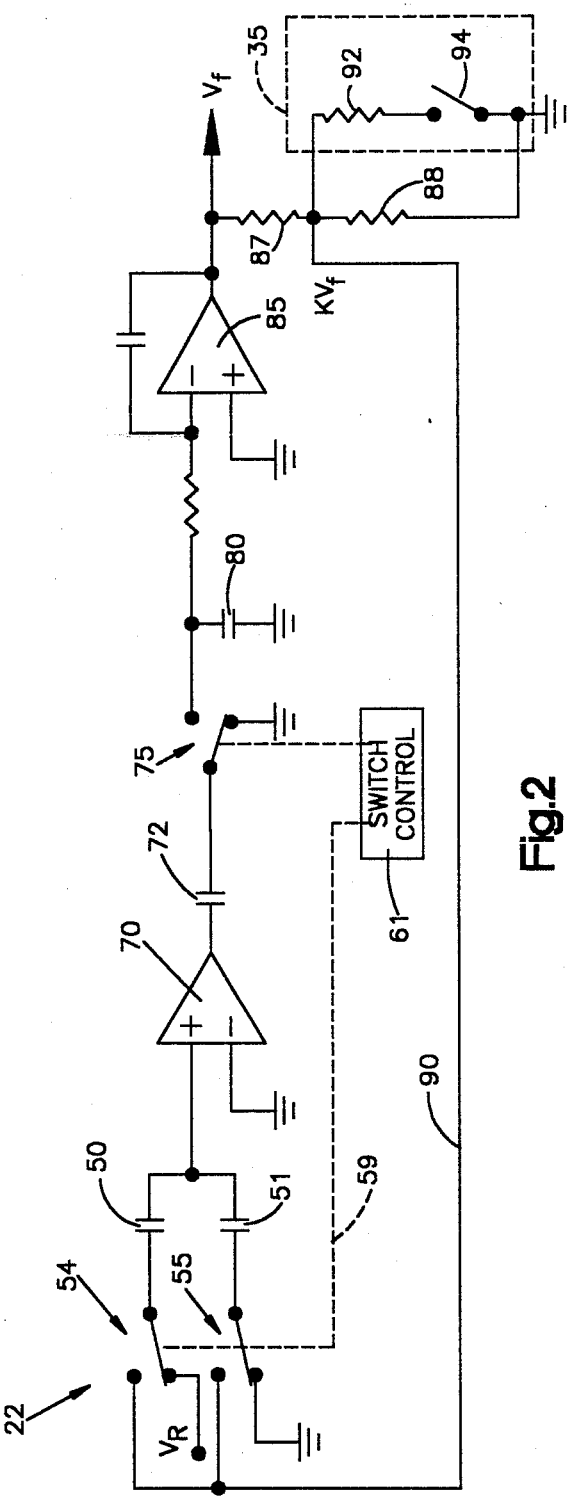
FIG. 2 is a block and schematic diagram of a preferred form of capacitance detection circuit and verification circuit employed in the present invention.

FIG. 2 shows the capacitance detection circuit 22 and verification circuit 35 in detail. Circuit 22 includes a pair of sensing capacitors, 50 and 51, connected in series. Capacitors 50, 51 are preferably formed as differential capacitors, with one decreasing in capacitance by the same value that the other increases in capacitance under a load applied to the weighing apparatus. A switching network, including switches 54 and 55, is connected to capacitors 50, 51. Switches 54 and 55 are controlled to synchronously switch between two operative states in response to a control signal on line 59 provided by switch control 61. In their first state, switch 54 connects capacitor 50 to a reference potential $V_R$, and switch 55 connects capacitor 51 to ground potential. In their second state, switches 54 and 55 connect both capacitors 50 and 51 to a feedback signal $KV_f$. Switches 54 and 55 may be conventional CMOS switches controlled by signals on line 59. Switch control 61 may be a conventional square wave or rectangular wave generator.

The junction point between capacitors 50 and 51 is connected by way of AC amplifier 70 and a short term charge storage capacitor 72 to a second switching network 75. Switch 75 is also controlled by switch control 61. Switch 75 in the state shown connects short term storage capacitor 72 to a reference potential such as ground. In its other state, switch 75 connects short term storage capacitor 72 to a long term charge storage capacitor 80. Switch 75 may comprise an electronic switch network, including a CMOS switch connected in series with an FET analog switch.

Long term charge storage capacitor 80 is connected to integrator 85, which provides an output signal proportional to the time integral of the voltage across capacitor 80. The output signal $V_f$ of integrator 85 is applied to a divider network comprising resistors 87 and 88. A portion of the signal $KV_f$ is fed back to switches 54 and 55 through feedback line 90. Verification circuit 35, comprising resistor 92 and switch 94, is connected to the divider network of resistors 87 and 88 and operates for verification purposes in a manner to be described below.

In operation, switches 54, 55 and 75 are switched between their opposite states periodically by switch control 61. With switches 54, 55 and 75 in the positions shown in FIG. 2, capacitors 50 and 51 produce an error signal at the junction point of the capacitors, which serves to charge short term storage capacitor 72. With switches 54, 55 and 75 in the positions opposite to those shown in the drawing, the charge on short term capacitor 72 is transferred to long term storage capacitor 80. The voltage across capacitor 80 is integrated and a portion $KV_f$ is fed back through the divider network, switches 54 and 55 and capacitors 50, 51. The feedback signal tends to null the A.C. signal at the junction point of the capacitors. At null, the feedback signal produced by the integrator is a function of the capacitance of capacitors 50 and 51.

The basic capacitance detection circuit 22, as well as certain variations and modifications thereto, are shown and described in U.S. Pat. No. 4,054,833, the disclosure of which is hereby incorporated by reference herein.

As mentioned above, changing a parameter in the circuit of FIG. 2 enables verification of the correct operation of the weighing system. Closing of switch 94 connects resister 92 in parallel with resistor 88 and changes the value of the attenuation factor, K, applied to the feedback signal $V_f$.

In the circuit of FIG. 2, it can be shown that $$V_f = \frac{V_R}{K}\left(\frac{C_{51}}{C_{50} + C_{51}}\right) \qquad (1)$$

where K is the ratio of resistor 88 to the sum of resistors 87 and 88, $C_{50}$ and $C_{51}$ are the capacitances of those capacitors and $V_f$ and $V_R$ are as shown in FIG. 2.

If it is assumed that capacitor 50 opens its gap and capacitor 51 closes it gap in response to increasing load, and that the gaps are both equal to G at zero load, then it can be shown that:

$$V_f = \frac{V_R}{2K}\left(1 + \frac{dg}{G}\right) \qquad (2)$$

where dg is the change in gap under load, $$V_f = V_R + \frac{V_R dg}{G} \qquad (3)$$

If resistor 88 is shunted by closing switch 94, the value of K will be reduced and the circuit of FIG. 2 will adjust itself to again achieve a null at the junction of capacitors 50 and 51.

Let $K_O$ be the initial attenuation and $K_v$ be the new attenuation with switch 94 closed. The change in $V_f$ produced by the change in attenuation is then:

$$dV_f = V_R\left(\frac{1}{2K_0} + \frac{dg}{2K_0 G} - \frac{1}{2K_v} - \frac{dg}{2K_v G}\right) \qquad (4)$$

If there is no weight on the scale so that dg=0, then $$dV_f = \frac{V_R}{2}\left(\frac{1}{K_0} - \frac{1}{K_V}\right) \quad (5)$$

In terms of resistance, $$dV_f = -\frac{R_{87}}{R_{92}} \cdot \frac{V_R}{2} \quad (6)$$

With a load on the scale so that dg is not equal to zero, $$dV_f = \frac{V_R}{2} \cdot \frac{R_{87}}{R_{92}} \left(1 + \frac{dg}{G}\right) \quad (7)$$

The digital value for $dV_f$ obtained during scale calibration is stored for later use during operation of the scale. Verification of correct operation is obtained by comparing values obtained during operation with the stored value of $dV_f$.

The same electronic circuits and components employed to convert capacitance variations to digital values of weight produce the feedback voltage difference signal $dV_f$. Therefore, any change in electronic circuits or components or in capacitance variations will be detected and compared to accuracy limits. Any degradation of the verification result $dV_f$ from the stored value will match degradation of the weighing results.

Figure 3:
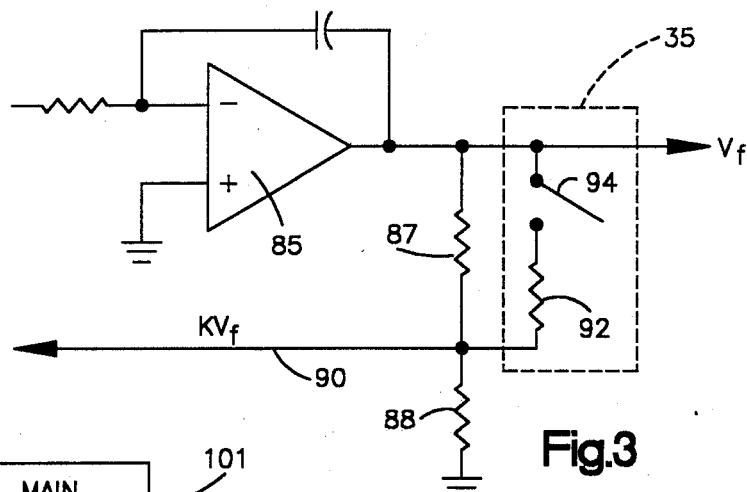
Figure 3 is a portion of the diagram of FIG. 3 showing an alternative arrangement of the verification circuit.

Inspection of equation (6) above indicates that the verification value $dV_f$ is independent of the value of resistor 88 in FIG. 2. Thus, the effect of changes in the value of resistor 88 will not be detected by changes in the value of $dV_f$. FIG. 3 illustrates an alternate connection of verification circuit 35 to detection circuit 22 to cause the verification procedure to take resistor 88 into account.

From equation (5) above $$dV_f = \frac{V_R}{2}\left(\frac{1}{K_0} - \frac{1}{K_V}\right)$$

In terms of the resistors in FIG. 3

$$dV_f = \frac{V_R}{2R_{88}}\left(\frac{R_{87}^2}{R_{87} + R_{92}}\right)$$

Thus, in FIG. 3 the verification value $dV_f$ is dependent upon the value of resistor 88.

If the parallel combination of resistors 87 and 92 is made equal to resistor 88, then verify switch 94 can be normally closed during weighing and opened for verification under control of microcomputer 28.

Figure 4:
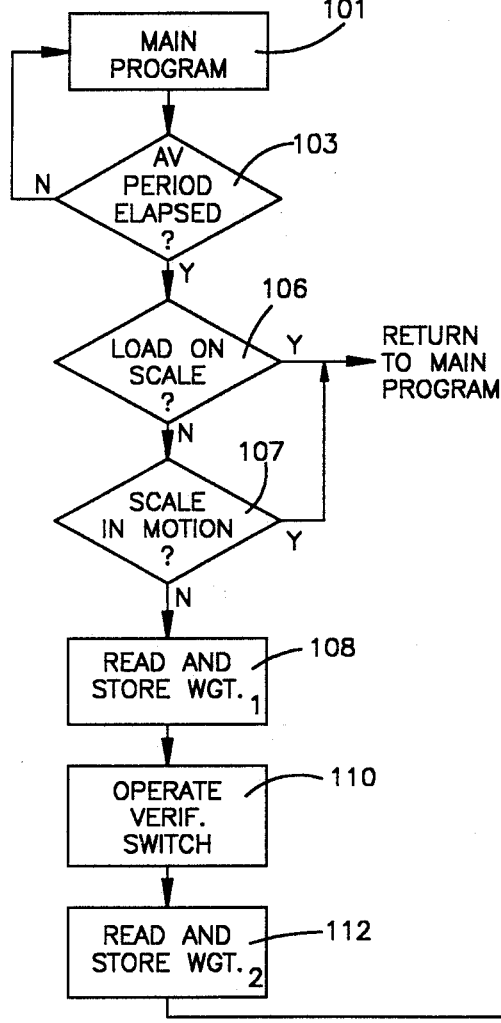
FIG. 4 is a flow chart of a program routine for the automatic verification procedure.
Figure 4:
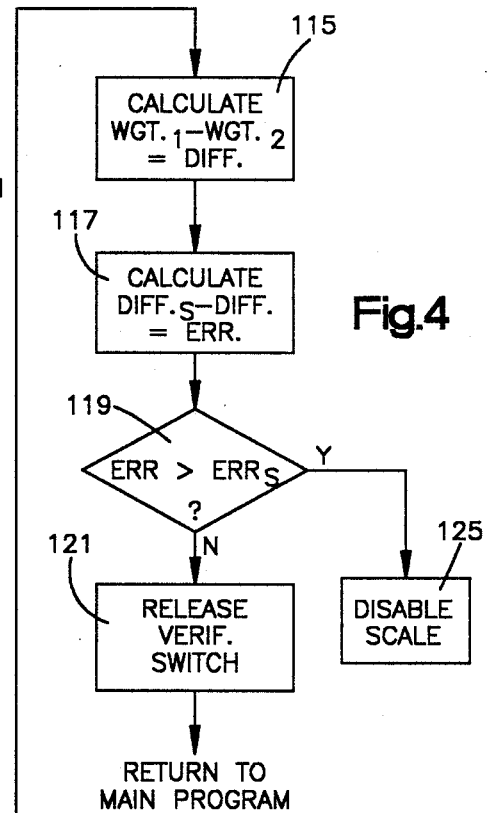

In operation, the automatic verification procedure is initiated by microcomputer 28 at predetermined intervals, provided that there is no weight on the scale and that the scale is not in motion from removal of a weight. As shown in FIG. 4, from the main program indicated by Block 101, a check is made at Block 103 to determine whether or not a predetermined time period has elapsed since the last automatic verfication procedure. If not, operation returns to the main program at Block 101. If the predetermined period has elapsed, a check is made at Block 106 to see if there is a load on the scale. If so, operation returns to the main program to weigh the object. If there is no load on the scale, a check is made at Block 107 to determine if the scale is in motion. If so, operation returns to the main program and then continues to cycle until no motion is detected at Block 107. At that point, a weight reading is taken and stored at Block 108 with no weight on the scale. At Block 110, verification switch 94 (FIGS. 2 and 3) is operated to change a parameter (the attenuation factor K for the feedback signal) in the capacitance detection circuit. At Block 112, a weight reading is then taken with the changed parameter and stored. The difference between the weight readings with the different parameter values is calculated at Block 115.

At Block 117, the resulting difference, which corresponds to $dV_f$, is compared to a difference value obtained in the same manner during calibration and stored for verification purposes. The comparison yields an error value which is compared at Block 119 to a stored allowable error value. If the error value is less than the allowable error, the verification switch is released at Block 121 and operation returns to the main program. If the error value is outside allowable error limits, the scale may be disabled from further weighing at Block 125 by, for example, blanking the display to indicate the verification error.

What is claimed is:

1. Weighing apparatus comprising load responsive means incorporating a capacitor variable in response to applied loads, a circuit for detecting the capacitance of said variable capacitor and providing a signal representative of said capacitance, means for changing a parameter in said capacitance detector circuit, and means for utilizing signals from said capacitance detector circuit obtained with said changed parameter to check the operation of the weighing apparatus.

2. Weighing apparatus as claimed in claim 1, wherein signals are obtained from said capacitance detector circuit before and after changing said parameter, said signals being used to check the operation of the weighing apparatus.

3. Weighing apparatus as claimed in claim 2 including means for determining the difference between said before and after signals, and means for comparing said difference to a stored difference to check the operation of the weighing apparatus.

4. Weighing apparatus as claimed in claim 1, wherein said changed parameter is an attenuation factor in a feedback signal to said capacitor.

5. Weighing apparatus as claimed in claim 1 wherein said capacitance detector circuit includes a feedback network for providing a feedback signal to said capacitor, said feedback signal being a function of the capacitance of said capacitor, and wherein changing said parameter changes the magnitude of said feedback signal to the capacitor.

6. Weighing apparatus comprising load responsive means incorporating a pair of capacitors, at least one of said capacitors being variable in response to applied loads, means connecting said capacitors in series, means for causing said capacitors to store a predetermined charge, a feedback network coupled to said capacitors for providing feedback signals representing the difference in charge on said capacitors from a predetermined value, said feedback signal being a function of the capacitance of said variable capacitor, means for producing a modified feedback signal, and means for using said modified feedback signal to check the operation of the weighing apparatus.

7. Weighing apparatus as claimed in claim 6, including means for determining the difference between said feedback signal and said modified feedback signal and means for comparing said difference to a previously stored difference to check the operation of the weighing apparatus.

8. Weighing apparatus as claimed in claim 6, wherein said modified feedback signal is produced by changing parameter applied to the feedback signal coupled to said capacitors.

9. Weighing apparatus as claimed in claim 6, including an electrical component and switch means for connecting said component in said feedback network to produce said modified feedback signal.

10. Weighing apparatus as claimed in claim 9, wherein said component is a resistor connected by switch means to a resistor in an attenuation circuit to modify the feedback signal coupled to said capacitors.

11. A method for verifying the correct operation of weighing apparatus employing a variable capacitance load sensor and a capacitance detection circuit, comprising the steps of obtaining a first signal representing the load on the weighing apparatus, changing a parameter in said capacitance detection circuit, obtaining a second signal representing the same load on the weighing apparatus with the changed parameter, and utilizing the first and second signals to verify the operation of the weighing apparatus.

12. A method as claimed in claim 11 wherein the steps are repeated at intervals.

13. A method as claimed in claim 11, including the step of determining the difference between the first and second signals, and comparing the difference to a stored difference signal to verify the operation of the weighing apparatus.

14. A method as claimed in claim 11 wherein the changed parameter is an attenuation factor.

15. A method as claimed in claim 14 wherein the attenuation factor is changed by reducing the value of a resistance in an attenuation circuit.

* * * * *